Patented Dec. 29, 1931

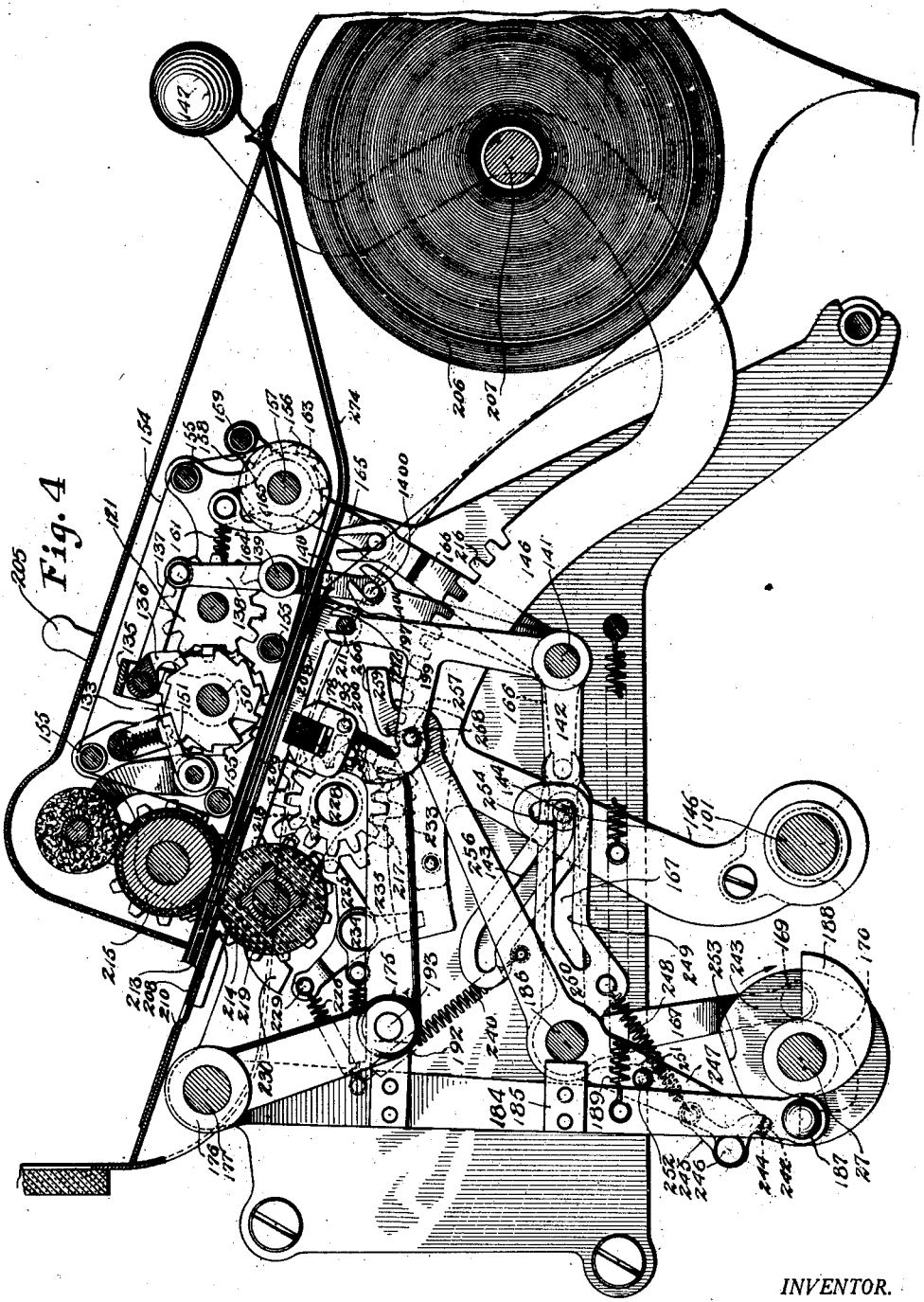

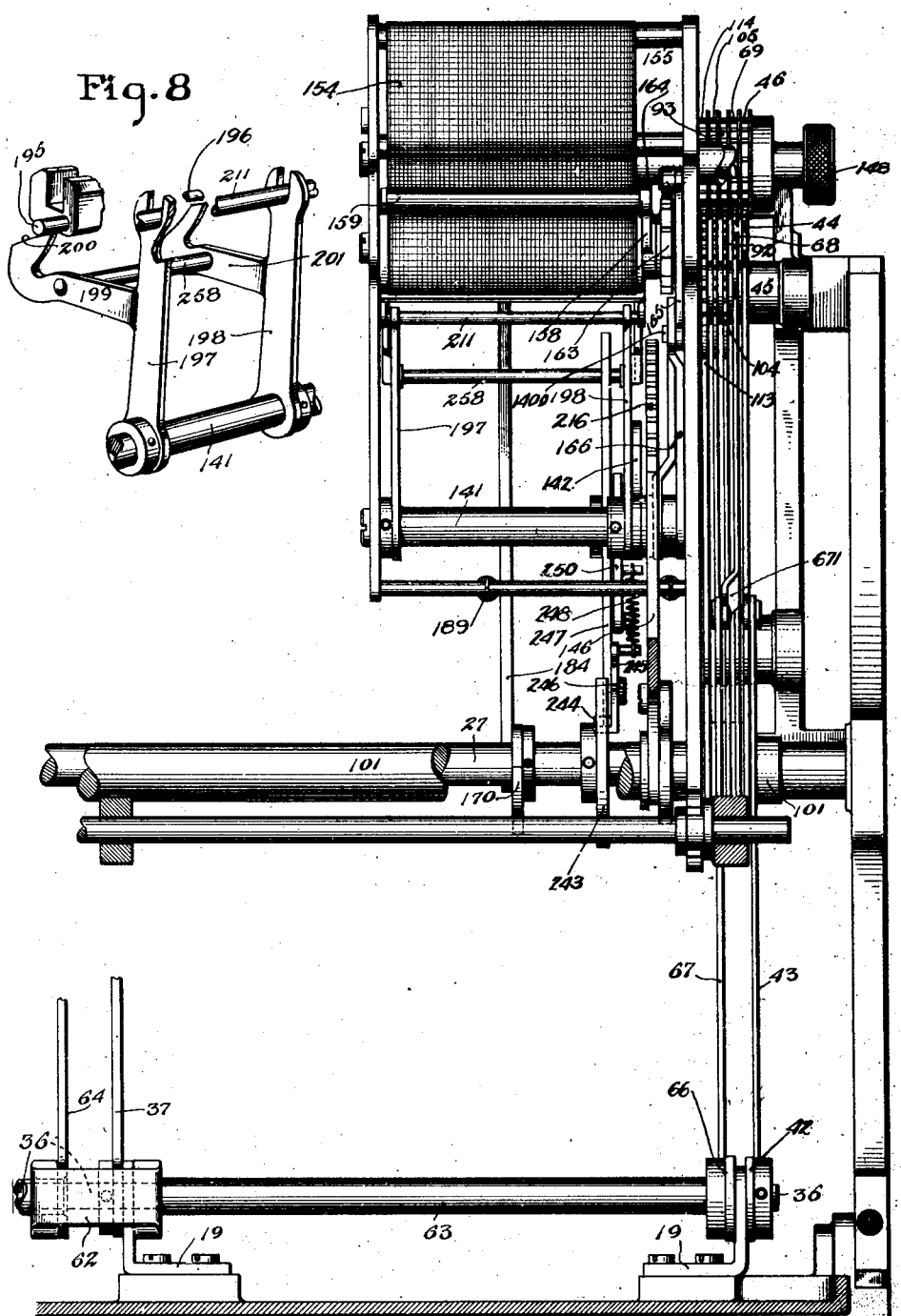

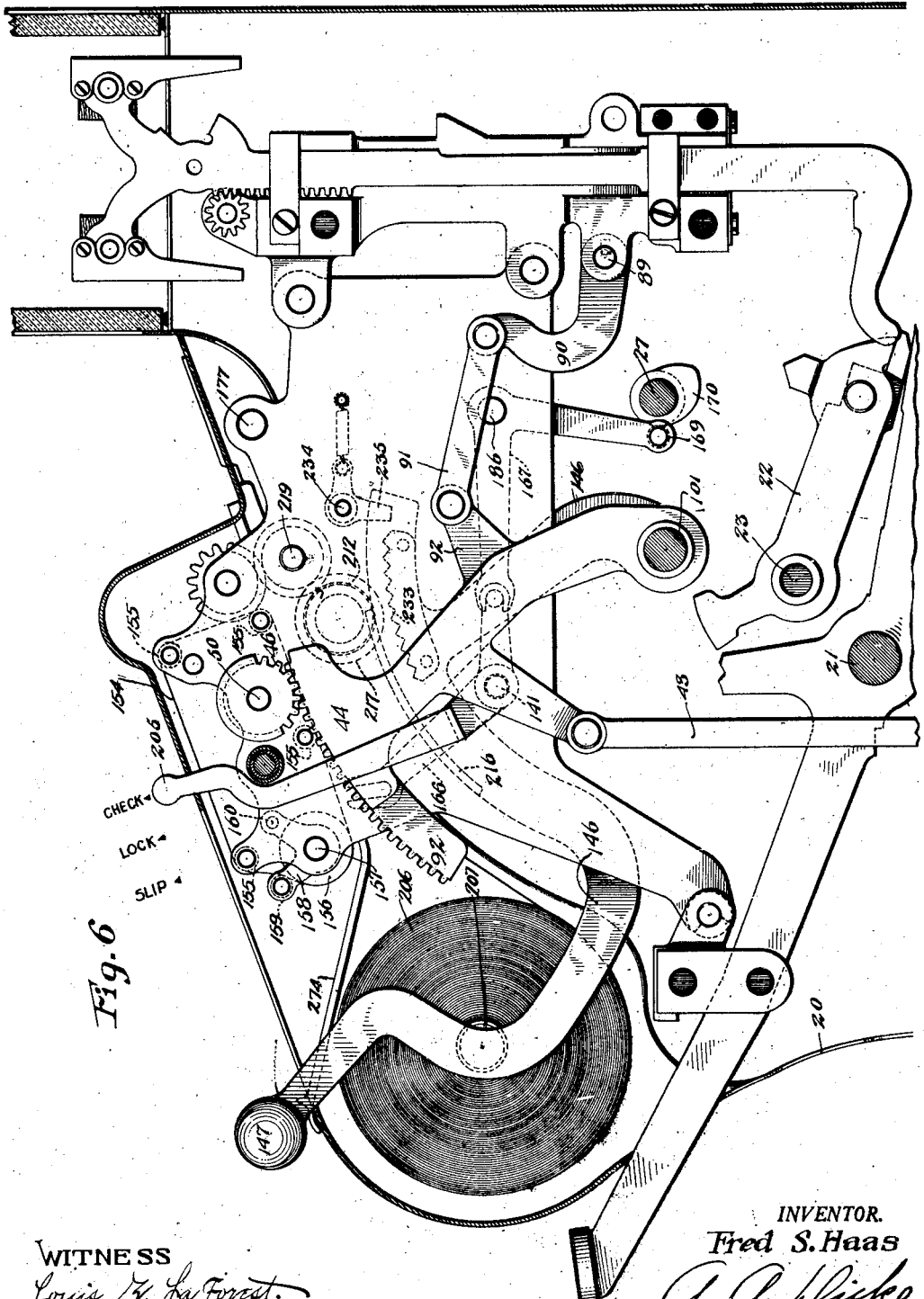

1,839,182

UNITED STATES PATENT OFFICE

FRED S. HAAS, OF MOUNT WASHINGTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed April 8, 1924, Serial No. 704,932. Renewed April 15, 1929.

This invention relates generally to improvements in cash registers and has particular reference to improvements in the printing mechanisms of such machines.

In the accompanying drawings the improvements are shown applied to a machine of the same general type as is shown and described in U. S. patent to Frederick L. Fuller, Number 1,742,701, and U. S. Patent 1,799,687 granted April 7, 1931, to Fred S. Haas. The latter application shows a machine provided with mechanism for printing and issuing checks or printing upon inserted sales slips, combined with devices whereby the mechanism may be conditioned for either check printing or sales slip printing. As will be more clearly apparent later on, however, the improvements are capable of being applied to or embodied in a number of other forms of cash registers and accounting machines without departing from the spirit of the invention.

An object of the present invention is to provide improved interlocking devices effective to insure correct operation of the improved machine as a whole regardless of the condition under which the printing mechanism may be operating; and associated controlling devices by means of which certain of the inter-locking devices may be disabled or rendered ineffective when the printing mechanism is changed to sales slip printing condition or when it is desired for some reason to be able to operate certain parts of the mechanism without either printing and issuing a check or printing upon a sales slip.

Another object of the invention is to provide interlocking devices to prevent adjustment or operation of the controlling devices during an operation of the machine.

The mechanism devised for effecting these various results is, however, capable of being used for other purposes, either as a whole or in part, and the statement of the objects is not intended as a limitation in this respect.

With the above and other objects in view, the invention consists in the novel combination and arrangement of parts, the features of novelty of which are pointed out in appended claims, and a preferred embodiment of which is shown in the accompanying drawings.

Of said drawings:

Fig. 4 is a section through the printing mechanism taken on the line 4—4 of Fig. 3.

Fig. 5 is a view in front elevation of the printing mechanism.

Fig. 6 is a sectional view looking toward the left of the machine taken on the line 6—6 of Fig. 2 and shows the printer frame and controlling devices associated with the check printing mechanism.

Fig. 7 shows one of the checks issued by the machine.

Fig. 8 is a view in perspective showing a part of the arms for supporting the check printing table.

Figure 1:
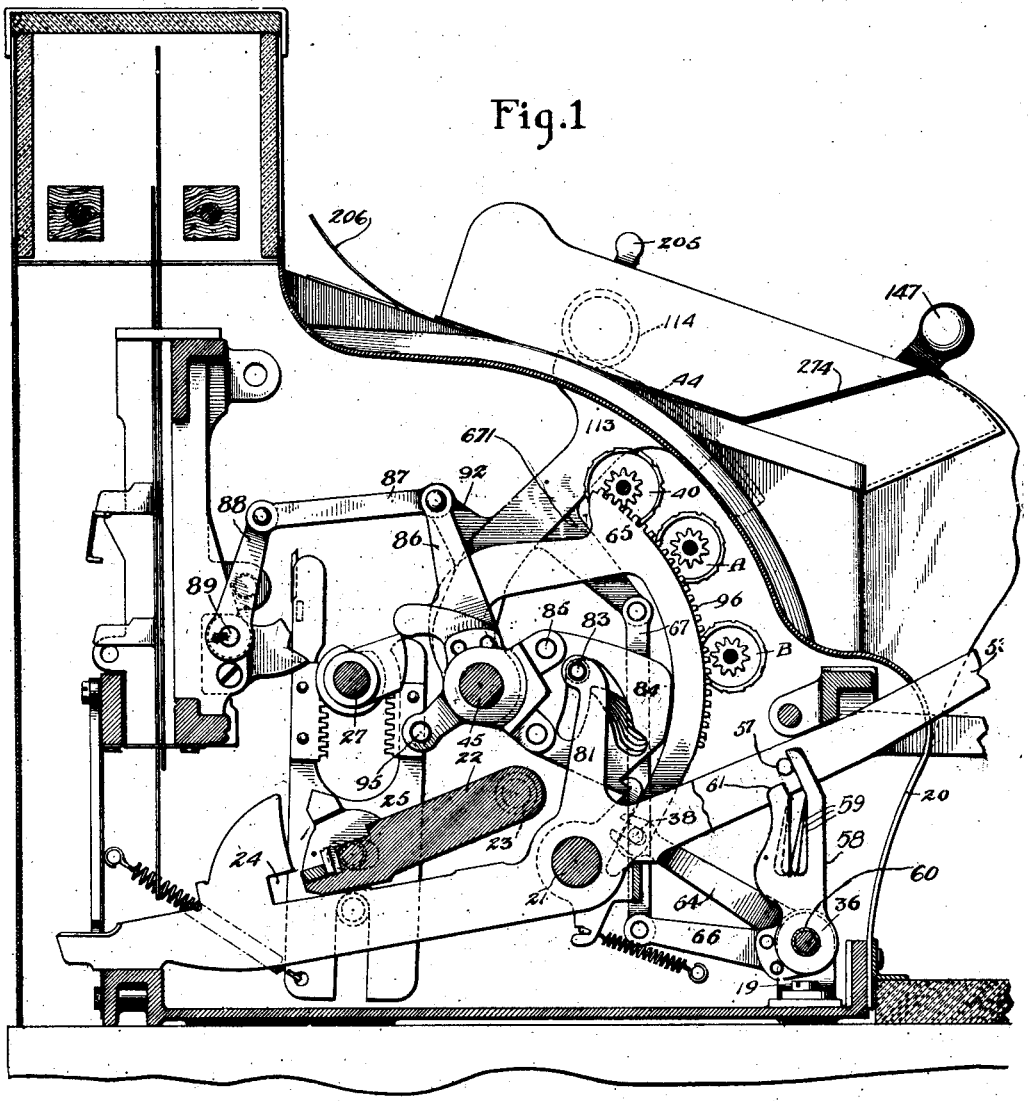
Fig. 1 is a vertical transverse sectional view of the illustrated machine taken on the line 1—1 of Fig. 2.

As shown in the drawings, the machine used to illustrate one embodiment of the invention is of the key operated type, that is, various functions, such as, indicating, registering, and printing are effected directly by operation of the keys. Addition of the present improvements does not materially affect the operation of such a machine in any of these respects, but when the keys are operated type carriers forming a part of the new mechanism are adjusted to represent the keys and impressions are then taken from the type carriers upon either a check strip or upon a sales slip depending upon which kind of printing the mechanism has been prepared to do.

In case the mechanism has been prepared or conditioned for check printing, after the keys have been operated and the characters representing them printed on the check strip a lever or handle is operated to feed a portion of the check strip containing the record of the keys operated to a position where it may be severed from the strip. The feeding operation is performed by a pair of cooperating rollers driven by the handle, one of which rollers is provided with inked type for printing on the face of the check.

For certain classes of transactions, such as "charge" transactions, it is desirable to have the machine so constructed as to print upon an itemized "charge" slip a total of the items, thereby providing a way of insuring the making of a record of the transaction in the record retaining devices of the machine. The improved machine is provided with a slot into which sales slips may be inserted to receive impressions.

In the present embodiment the work of conditioning the printer for different kinds of printing is performed by adjustment of manipulative devices comprising a lever which operates through suitable connections to lock the check feeding mechanism, and disable or render ineffective interlocking mechanism controlling the sequence of operation of the keys and the check feeding and printing mechanism.

The interlocking mechanism just referred to is so constructed that after a key or keys have been operated to print upon a check a second operation of the keyboard cannot be performed unless the check feeding mechanism is first operated. Operation of the feeding mechanism will affect the interlocking mechanism to free the keys for operation, but freeing them will at the same time affect the interlocking mechanism to prevent a second operation of the check feeding mechanism without an intervening operation of the keyboard.

Adjustment of the mechanism in preparation for slip printing frees the keys for successive operations without intervening operations of the check feeding mechanism. In fact, the feeding mechanism becomes locked so that it cannot be actuated. To print upon sales slips when the mechanism is in slip printing condition, all that is necessary is to insert the slips to a position where they may receive impressions from the type carriers and then depress the keys representing the items. This causes the items to be printed upon the slips, after which the slips are simply withdrawn from the machine.

The mechanism for controlling the condition of the printing mechanism is so constructed that it may be adjusted not only to prevent insertion of a sales slip, but also at the same time to prevent operation of the mechanism usually operated to print upon checks or sales slips. The reason for this is that it may at times be desirable to operate the keys of the machine without either issuing checks or printing upon sales slips. When in this non-printing condition the interlocking mechanism before referred to is thrown out of action so that there is no interference with repeated or successive operations of the keyboard.

When the mechanism is operated under check printing conditions, a pair of impression hammers is operated to make the impression, one for printing the consecutive numbers and the other to print the date, identifying characters and amount of the item. When the mechanism is adjusted to the non-printing condition both of the impression hammers are inoperative, while under slip printing conditions only the consecutive number impression hammer fails to operate. Under the condition last mentioned, therefore, the consecutive number type carriers do not print upon the inserted slips. And as the consecutive numbering devices are operated to add one directly by movement of the check feeding devices the number cannot be changed or increased, because, it will be recalled, the feeding mechanism becomes locked when the printing mechanism is prepared for slip printing.

The controlling mechanism just referred to cooperates with devices rendered effective at the start of an operation of the machine whereby a different condition cannot be set up until the operation is completed.

The operating keys work in slots 20 (Figs. 1 and 6) in the machine casing and are pivoted on a rod 21 extending across the machine. Resting upon all of the keys is a key coupler 22 pivoted as at 23 in the side frames of the machine. When the outer ends of the keys are depressed the key coupler is rocked on its pivot and engages with notches 24 in the rear portions of the keys. The construction and purposes of such key coupler mechanism are well known in the art and need not be described in detail.

Connected to the key coupler is a double rack 25 (Figs. 1 and 2) the construction being such that as the key coupler 22 is rocked by the keys the rack 25 is raised and lowered. The teeth of the double rack engage a gear 26 (Fig. 2) secured to the shaft 27, first on one side and then on the other in such a way that a complete movement of the key coupler 22 and double rack 25 will effect a complete rotation of the shaft 27. The shaft 27 carries cams and other devices for operating various parts of the mechanism. The mechanism for effecting rotations of the shaft has not been described in detail because it is old and so well known this construction being shown and described, for example, in the patent to Carney 786,346, April 4, 1905.

Figure 2:
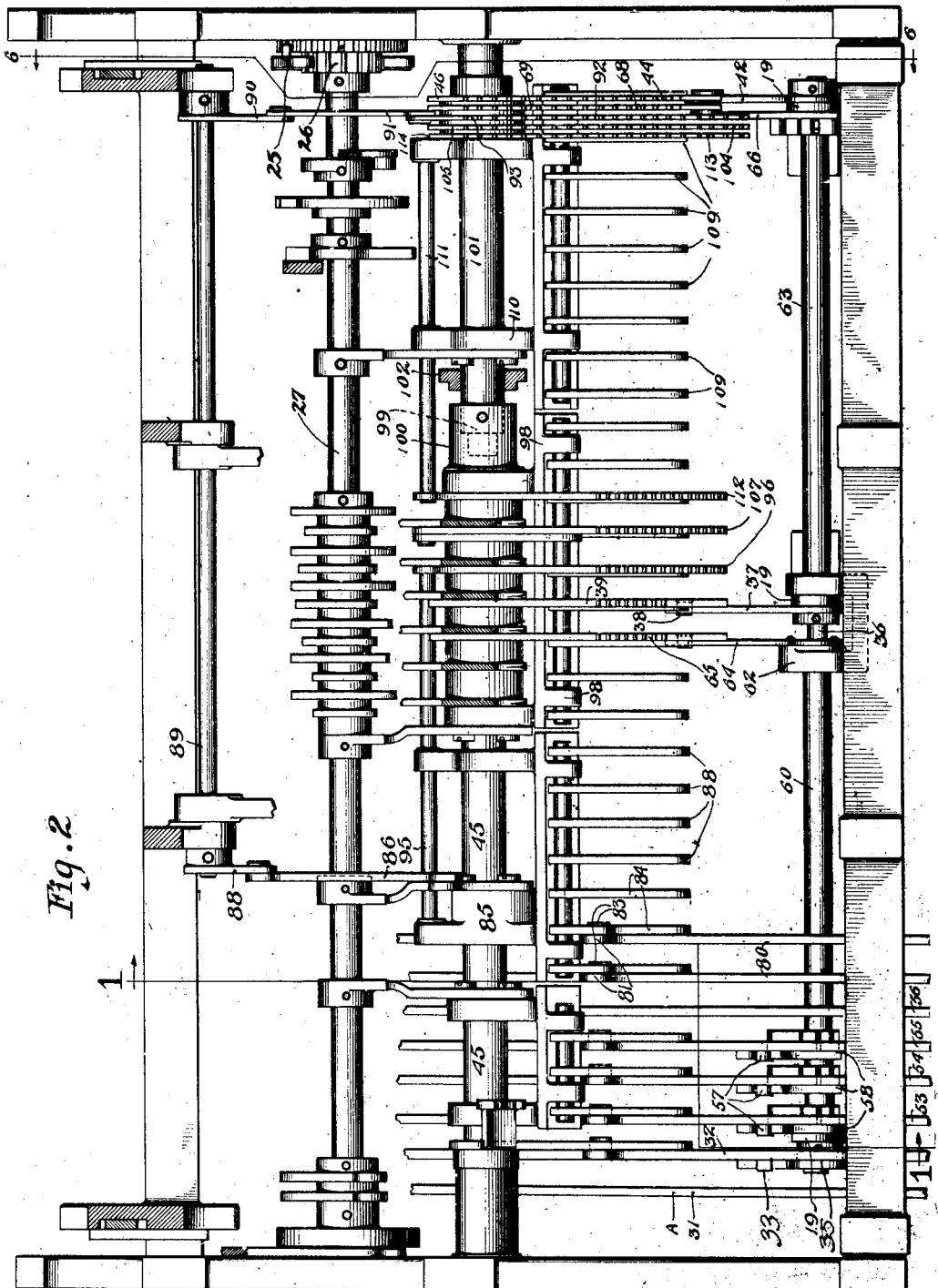
Fig. 2 is a plan view of some of the differential devices and shows particularly the type carrier adjusting connections.

The illustrative machine is provided with four special or transaction keys for "Paid out", "Charge", "Received on account" and "No sale" items, designated respectively by the numerals 53, 54, 55 and 56, (Fig. 2). The "No sale" key 56 has certain functions such as operating drawer release mechanism, but it does not set a type carrier. There is a type carrier provided for printing the characters designating the various special keys, but it is normally held in a position to print the character representing "Cash" which character likewise serves in the present embodiment to designate "No sale" transactions, and is shifted to any of the three other positions by the corresponding one of the keys 53, 54 or 55. Each of these keys is provided with a stud 57 (Fig. 1) engaging a cam slot 59 formed in a cam plate 58 secured to a tube 60 surrounding a shaft 36. The slots in the plates are graduated so that each key will impart different degrees of movement to the tube 60. The rearward portion of each cam plate is cut away as at 61 (Fig. 1) so that the cam plates may be moved forwardly when a key is depressed without interference by the studs on the undepressed keys.

The tube 60 terminates at its right hand end at substantially the central portion of the machine (Fig. 2) and has secured to it a yoke 62, the right hand end of the yoke being secured to a similar tube 63 for setting up the type carrier in the new printing mechanism. Secured to the yoke 62 is an arm 64 (Fig. 1) connected to an extension of a segmental rack 65 meshing with a pinion rigidly connected to the type carrier 40 of the old recording mechanism, having on its periphery type for printing characters to represent the various classes of transactions. From the foregoing it is clear that the differential movements of the tube 60 by the associated keys will effect corresponding movements of the type carrier to its various printing positions.

The connections for transmitting movements from the tube 60 to the type carrier of the new printing mechanism comprise an arm 66 secured to the extreme right hand end of the tube 63 and a link 67 (Fig. 1) the upper end of the link being connected to a downward extension 671 of a segment 68, (Figs. 2 and 5), similar to segment 44 shown in Fig. 6, loose on a shaft 101. The segment 68 meshes with a gear 69 secured to a tube (not shown) loose on a shaft 50 integral with a type carrier 70 (Fig. 3) having on its periphery the type for printing various classes of transactions.

The two keys shown in Fig. 2 designated as 31 and 32 are the keys for two clerks or two departments. For convenience they will be referred to as the "A" and "B" clerks' keys. They are connected with and operate mechanism for controlling engagement of either the totalizer "A" or the totalizer "B", (Fig. 1) with operating segments of the differential mechanism. The totalizer engaging mechanism is not directly involved in the present invention, and is not shown or described in this application. A showing and description of one form thereof may be found, however, in the Fuller application above mentioned.

The "A" key 31, in addition to its totalizer selecting or engaging function, operates an indicator and does certain other work, but is not connected to devices for setting a type carrier. The machine shown in the Fuller Patent 1,742,701 has, however, a type carrier for printing either the letter "A" or the letter "B" upon the record strip and, in addition thereto, a similar type carrier is included in the improved mechanism to print upon the check or inserted slip. The position of these two type carriers is controlled by the "B" key 32.

As shown in Fig. 2 the "B" key 32 is provided with a stud 33 engaging an open slot formed in a rock arm 35 (similar to the arm 58, Fig. 1, previously mentioned) secured to the shaft 36 (Fig. 2). The shaft 36 is journaled in suitable ears 19 (Fig. 5) fastened to the base of the machine. It is apparent that when the B key 32 is depressed it will act through the connections described to rock the shaft 36 clockwise (Fig. 1) and that when the key 32 returns to its undepressed position the shaft 36 will be restored to its starting point.

Secured to the shaft 36 is another arm 37 (Fig. 2) similar to arm 64 (Fig. 1) of the transaction bank, bifurcated at its rear end to engage a stud 38 carried by a downward extension of the A and B type carrier segment 39 of the recording mechanism just as shown in the Fuller application. The movement of the shaft 36 will adjust the A and B type carrier from its normal position to carry the A type away from and bring the B type to the printing line whenever the B key is depressed.

The connections for transmitting movements of shaft 36 to the new type carrier 41 (Fig. 3) comprise an arm 42 (Figs. 2 and 5) secured to the shaft 36 and connected by a link 43, (Figs. 5 and 6), to an extension of a segment 44 loose on a shaft 101. The teeth of the segment 44 are in mesh with a pinion 46 secured to a tube loose on a shaft 50 (Fig. 6) journaled in the new mechanism supporting frames, and integral with the type carrier 41 provided with the A and B type.

To the right of the transaction group of keys in a series of seven keys 80, for entering items running from $1.00 to $7.00 only two of which keys are shown (Fig. 2). Each key 80 is provided with an upwardly extending arm 81 best shown in Fig. 1, carrying a stud 83 engaging a slot in one of a set of plates 84 rigidly mounted in a frame 85 mounted loose on the shaft 45. The slots in the plates 84 are graduated so that each of the keys will impart a different degree of movement to the frame 85 and consequently to parts attached thereto. Rigidly secured to the frame 85 is an arm 86 connected by a link 87 to an arm 88 secured to a shaft 89 which is, as shown in Fig. 2, journaled in lugs on the back frame of the machine.

The connections for transmitting motion of the shaft 89 to the type carrier of the new printing mechanism comprises an arm 90 (Figs. 2 and 6) secured to the shaft 89 and connected by a link 91 to a segment 92, which meshes with the teeth of a gear 93 secured to a tube (not shown) integral at its opposite end with a type carrier 94 (Fig. 3) adapted to print an amount corresponding to the value of the key depressed.

Mounted in extensions of the rock frame 85 is a rod 95 (Fig. 2) extending beyond the frame to a segment 96 loose on the shaft 101. This segment is for setting the dollar type carrier in the old recording mechanism and actuating the dollars wheel of the totalizers. It is clear that a differential movement of the rock frame 85 under control of its associated keys will effect corresponding movement of the segment 96 and of the dollar type wheel.

To the right (Fig. 2) of the dollar differential frame 85 is a differential frame 98 operated by the 10¢ to 90¢ keys to impart different degrees of movement to the associated mechanism. It will be seen that the shaft 45 is journaled at its left end in the frame of the machine and terminates at its right end at the point marked 99. This point of termination is within a hub 100 secured to the shaft 101 previously mentioned, which shaft is rotatably supported by the right hand machine frame and by a bracket 102 on a frame 103 (see also Fig. 3) and which in the illustrative machine supports the totalizers and record strip printing mechanism. The frame 98 is, at its left side, loose upon the shaft 45, and at its right integral with the hub 100. Secured to the shaft 101 is a segment 104 substantially similar to the segment 92 of Figs. 2 and 6 and meshing with a gear 105 (Fig. 3) connected by a tube (not shown) to a type carrier 106 for printing characters representing 10¢ to 90¢ amounts in the new recording mechanism.

Rigid with the frame 98 is a segment 107 (Fig. 2) operating the dimes type carrier in the old recording mechanism and the dimes registering wheels of the totalizers.

The penny keys operate upon cam plates 109 (Fig. 2) fastened in a differential frame 110, in the same manner as hereinbefore described in connection with other groups of keys. There are nine of the penny keys and their connections with the differential frame 110 are such that by selective operation of them the frame may be moved to nine different positions. Secured in extensions of the frame 110 is a rod 111 engaging a segment 112 loose upon the shaft 45. This segment operates the penny type carrier in the recording mechanism and the corresponding wheels in the totalizers. Secured to the right hand side of the differential penny frame 110 is a segment 113, Figs. 1, 2 and 3, engaging a gear 114, connected by a tube (not shown) to a type carrier 116 (Fig. 3) for printing the characters representing 1¢ to 9¢.

In axial alignment with the type carriers 41, 70, 94, 106 and 116, are type carriers 118, 119, and 120 (Fig. 3) for designating dates. Meshing with the teeth of a gear rigid with the type carrier 118 is a gear 121 secured to a shaft 122. At its right hand end the shaft is provided with a knurled knob 123 by means of which the type carrier 118 may be adjusted to the different positions. The printing face of the type carrier bears type for printing characters representing the months. The type carriers 119 and 120 are provided with similar gears meshing with gears 124 and 125 rigid with tubes 126 and 127 provided with setting knobs 128 and 129 by means of which the type carriers 119 and 120 may be adjusted to represent the various days of the month.

Figure 3:
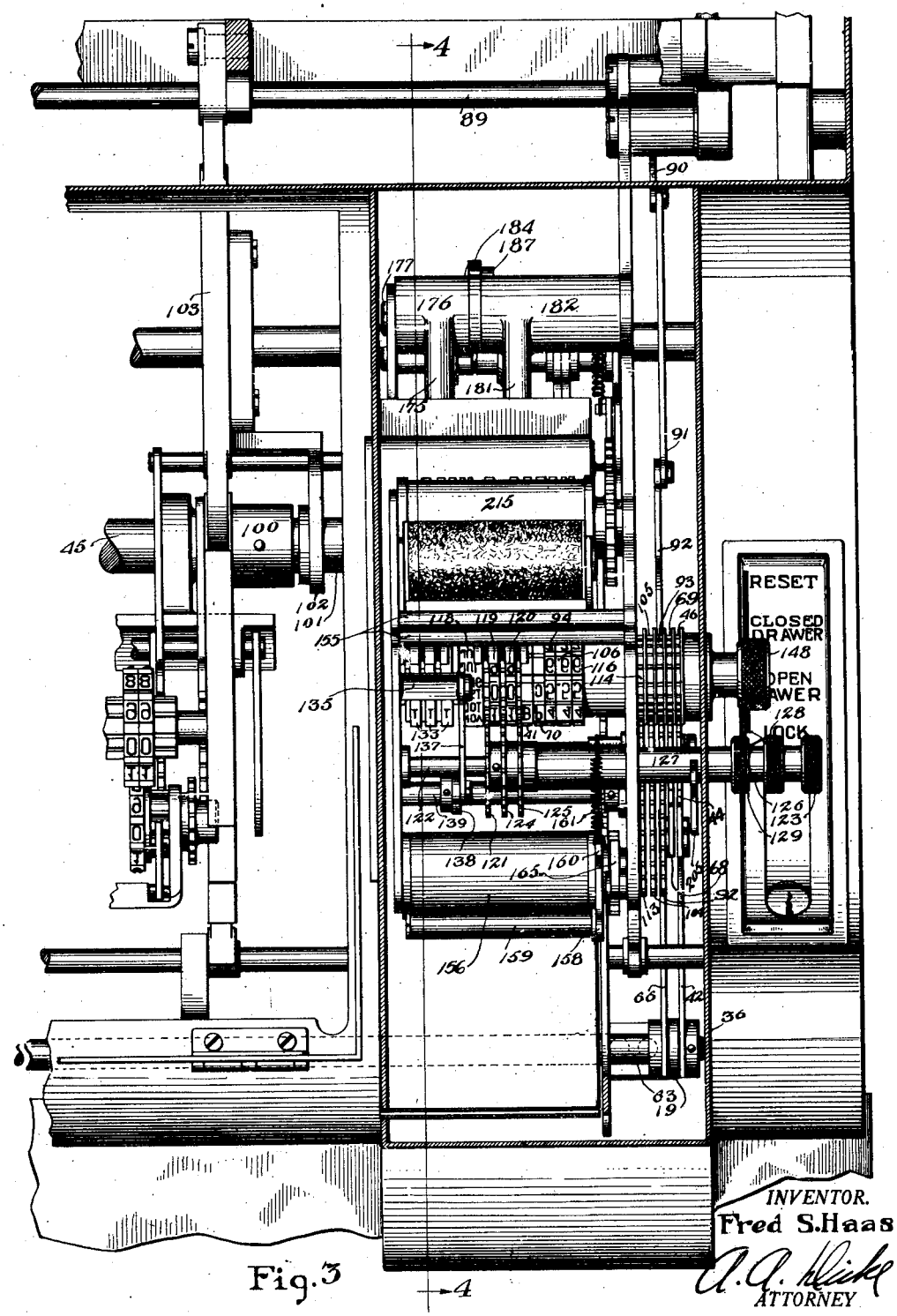
Fig. 3 is a top plan view of the improved printing mechanism and some of the operating connections and associated accounting mechanism.

Mounted upon the shaft 50 and, therefore, in axial alignment with the other type carriers just mentioned, are three type carriers 133. (Figs. 3 and 4) for printing the consecutive numbers upon the checks. These carriers and the mechanism for operating them are of the usual deep notch transfer type. A bail 135, Figs. 3 and 4 loose upon the shaft 50 supports the usual operating and carrying pawl 136. One side of the bail 135 is connected by a link 137, (Fig. 4) to an arm 138 secured to a shaft 139 (Fig. 3). To the opposite end of the shaft 139 is secured an arm 140 provided with a stud 1400 (Fig. 4) engaging a bifurcation formed in the vertical arm of a bell crank 1401. The bell crank 1401 is loosely mounted upon the shaft 141 and its horizontal arm 142 has a cam slot 143 engaging a stud 144 on the side of the feeding lever 146. This lever, which has an operating handle 147, is moved each time that a check is issued and consequently acts through the stud 144, cam slot 143 and other connections described to oscillate the bail 135 a sufficient distance for the pawl 136 to add one on the consecutive numbering type carriers. Spring pressed pawls 151 retain the numbering type carriers in their various positions.

The consecutive numbering type carriers may be turned to zero whenever desired by turning the knob 148 in the manner described fully in the Haas application hereinbefore mentioned.

The ink for printing from the consecutive numbering type carriers and the other type carriers in axial alignment therewith is supplied by an inked ribbon 154, Figs. 1 and 4, passing below the type carriers around supporting rollers 155, and a roller 146 of felt or other material capable of carrying an ink supply for the ribbon. The roller 156 is rotatable on a rod 157 and pivoted on this rod at one end of the roller 156 is an arm 158 carrying another roller 159. Integral with the arm 158 is an arm 160 connected by spring 161 to the printer frame (Fig. 3). The ribbon passes back of the roller 159 so that the spring 161 can serve to maintain a certain amount of tension upon the ribbon.

The ribbon is given a step of movement at each operation of the machine. This not only prevents successive impressions through the same portion of the ribbon, but it also serves to bring the different portions of the ribbon into contact with the roller 156 and thereby permits the roller to moisten or apply ink to the ribbon. The mechanism for driving the ribbon comprises a ratchet disk 163, Fig. 4, rigid with the roller 156 and a pawl 164 carried by an arm 165 loose on the rod 157. The arm 165 carries a stud engaging a bifurcation in one arm of a bell crank 166 pivoted upon shaft 141. The horizontal arm of the bell crank is similarly connected to a second bell crank 167 (Figs. 4 and 6) loosely mounted on a transverse shaft 186, the vertical arm of the bell crank 167 carrying a roller 169 to engage an eccentric cam 170 secured to the shaft 27. The shaft 27, it will be recalled, makes a complete rotation at each operation of the machine, and the mechanism just described is so proportioned and connected that at each rotation the pawl 164 will be operated to impart a step of movement to the rachet disk 163 and the roller 156.

The impressions are taken from the consecutive number, date and item carriers by two percussion hammers, one for the consecutive number, and the other for the rest of the type carriers. The consecutive number hammer 175, Figs. 3 and 4, has a hub 176 loose on a rod 177. At its forward end it carries an adjustable impression block 178 of rubber or other suitable material of sufficient length to take an impression from all three of the consecutive number type carriers. The impression hammer 181 (Fig. 3) for printing from the rest of the type carriers is substantially the same as the consecutive type hammer, and has a hub 182 loose on the rod 177. At its forward end the hammer 181 carries an impression block which is not shown in the drawings, but is the same as the impression block 178 previously described, except that it is long enough to print from all of the date and item printing type carriers.

Printing movement is imparted to the impression hammers by an arm 184 pivoted on the rod 177 between the impression hammer hubs 176 and 182. The forward edge of the arm 184 has a shoulder 185 engaging the rod 186. Near its lower end the arm 184 carries a stud 187 in the plane of rotation of a cam 188 fastened to the rotation shaft 27. During the rotation of the shaft the cam will act against the stud 187 to swing the arm 184 against the tension of a spring 189 until the cam passes out of engagement with the stud whereupon the spring 189 will snap the arm 184 forward until it is arrested by the rod 186. The arm 184 has a portion 192 extending at right angles to its length and engaging a stud 193 on each of the hammer arms. As best shown in Fig. 4, the hammers normally rest with their studs in engagement with the right angle portion 192 of the impression hammer operating arm 184 and in this normal position the impression blocks in the hammers are some little distance from the type carriers. When the hammer operating arm 184 is swung by the cam 188 the hammers will follow and when the cam releases the arm both of the hammers will be thrown against their type carriers to take impressions.

The mechanism previously mentioned whereby the impression hammer 175 may be prevented from printing or by which under certain conditions both hammers may be disabled, performs its function by movement of the hammer or hammers toward the type carriers far enough to carry the studs 193 out of engagement with the normally coacting portion 192 on the hammer operating arm 184 and holds them in that position. With this in view the consecutive number hammer head 175 is provided with a stud 195, Fig. 4, and the other hammer 181 with a similar stud 196 (Fig. 8). Attached to the shaft 141 is a pair of arms 197 and 198 (Figs. 5 and 8). The arm 197 has an extension 199 (Fig. 4) having a cam surface 200 to engage the stud 195 while the arm 198 has a similar extension 201 and cam surface to engage the stud 196 secured to the hammer 181.

Secured to the shaft 141 is a controlling lever 205 which, as shown in Fig. 6 is adjustable to three positions, marked respectively, Check, Lock and Slip. The construction and relation of the parts is such that when the controlling lever 205 is at the check position neither the stud 195 nor the stud 196 will be engaged by the cam surfaces on the arms 199 and 201 and the hammer operating arm 184 will, when it snaps forward, impart printing movement to both of the hammers. When the controlling lever 205 is moved to the lock position the cam surface on the arm 201 will be brought into engagement with the stud 196 on the date and amount hammer 181 and the cam surface 200 will be brought into engagement with the stud 195 on the consecutive number hammer 175. The cam surfaces are so graduated that they will act against the associated studs to move the hammers towards the type carriers far enough to hold the studs 193 on the hammers out of engagement with the operating portion 192 of the hammer operating arm 184. As a result neither of the hammers will be operated to make an impression.

When the lever 205 is moved to the slip position the cam surface on the arm 201, (Fig. 8) which surface is comparatively short, will be carried past its associated stud, while the cam surface 200 of the arm 199 will, because of its greater length, remain in engagement with the stud 195 and hold the consecutive number hammer 175 in its inoperative position, and when the hammer operating arm 184 is released by the cam 188 only the date and amount hammer 181 will print.

The checks printed and issued by the machine are drawn from a roll 206 (Figs. 4 and 6) of paper or other suitable material, loosely supported by a stud 207. The strip passes from the roll 206 between plates 208 and 209, connected together and slidably supported at the rear end by a plate 210 attached to the machine casing. At their forward ends the plates are supported by a rod 211 engaging slots at the upper ends of the arms 197 and 198 previously mentioned. Between the two plates, may, if desired, be placed a leaf spring 1212 which coacts with the upper plate 209 to provide a tension device for preventing accidental movement of the paper relative to the plates. As previously pointed out, the arms 197 and 198 are moved by operation of the control lever 205 and owing to the engagement of the arms with the rod 211 any movement of the control lever and arms will be transmitted to the check paper table or chute and this movement, owing to the tension spring 1212 will serve to shift the check strip slightly toward the front of the machine.

In most places of business, checks, or, as they are sometimes called, receipts, will be required for a majority of transactions entered in the machine. When a check has been fully ejected by operation of the mechanism it is torn off from the strip, the rear edge 213 of the plate 209 serving satisfactorily as a tearing guide. The next check to be issued will, therefore, have one end adjacent the tearing edge 213 and will rest between a roller 214 and a roller 215, the latter having on its periphery an electrotype for printing any desired matter. In the present machine the electro is designed to print the name and address of the proprietor. The rollers 214 and 215 are geared together and are driven by movement of the check feeding lever 146. The feeding lever carries a segmental rack 216 which, during movement of the lever will engage a gear 212 (Fig. 4) loosely mounted on a stud 228 which is carried by an arm 218. The arm 218 is loose upon the shaft 219 which supports the roller 214. Secured to the gear 212 is a larger gear 217 meshing with the gear attached to the roller 214. Due to the fact that the preponderance of weight is on the forward end of the arm 218 the teeth of the gear 212 will fall in mesh with the teeth 216 of the segmental rack. When the handle 147 is swung rearward the rollers 214 and 215 will be given a complete rotation and during the return movement the teeth of the gear 212 will ratchet over the teeth 216, by reason of a locking pawl 225 holding the gear against reverse movement. The locking pawl 225 is loose upon a stud 234 and is held in engagement with the inter-dental space of the gear by a spring 226. The arm 218 is further provided with a rearward extension 230 which, (as the gear 212 ratchets over the teeth 216) is depressed to co-operate with an arm 229 integral with the pawl 225 and force the pawl into positive engagement with the inter-dental spaces of the gear.

A full stroke mechanism is provided to compel a complete movement of the lever 146 and its handle 147 in both directions. This full stroke mechanism comprises a plate 233, Figs. 4 and 6, attached to the feeding lever or handle and concentric with the teeth 216. Pivotally supported on a stud 234 is a pawl 235. When the segment 233 is moved toward the rear of the machine to feed out a check the pawl 235 will be swung slightly on its pivot and then act with the notches in the segment to prevent reverse movement of the handle. At the end of the check feeding stroke of the handle the pawl 235 will drop in front of the rack 233 and then during the forward movement of the handle will be swung the other way and co-operate with the rack to prevent reverse movement of the handle until after the movement back to its normal starting point has been completed.

In machines of this type it is sometimes desirable that interlocks be provided for controlling the sequence of operations of the machine. The machine in the drawings has an interlocking mechanism so constructed that after a key or keys have been operated to print upon a check the keys will be locked against depression for a second operation until after the check handle has been actuated to feed a check. Locking mechanism is further provided for preventing a second operation of the check feeding handle but a subsequent operation of the keys will disable the locking mechanism to release the check feeding mechanism.

This mechanism is best shown in Fig. 4. The parts are all shown in the positions they occupy after an operation of the keys with the machine in check printing condition. At this stage the shaft 27 is held against rotation by a shoulder 242, on a disk 243 attached to the shaft, engaging a lug 244 on an element 245 pivoted at 246 to the side of a bellcrank 247 journaled on the shaft 186. A spring 248 tends at all times to rock the elements 245 in a clockwise direction on its supporting pivot while a spring 240 connected to the upper arm 256 of the bellcrank 247 insures contact between the disk 243 and element 245 at all times when the lever 147 is not displaced from normal position. Disengagement of the lug 244 from the shoulder 242 is effected by rocking the bell crank 247 on its pivot 186 against the tension of spring 240 thereby swinging the lower end of the bellcrank 247 rearward and the element 245 far enough to release the disks 243 and shaft 27.

This movement of the bell crank 247 is imparted during the rearward stroke of the feeding handle 147. The means for effecting this comprises the stud 144 co-operating with a cam slot 249 formed in a plate 250 loosely pivoted upon the shaft 186. The plate 250 is further provided with a downward extension or tail 251 abutting against a stud 252 secured to the bell crank 247. Spring 248 is provided with sufficient tension to tend to rock the element 245 clockwise as well as to pull plate 250 downwardly, but as clearly shown in Fig. 4 the downward movement of plate 250 is limited by engagement of tail 251 with the stud 252 carried by bell crank 247.

When the feeding lever is moved rearwardly the stud 144 moving in a path concentric with the shaft 101 engages the lower edge of the cam slot 249 depressing the forward end of the plate 250 downwardly, and by virtue of engagement between the tail 251 and stud 252 rocking bell crank 247 rearwardly, thereby disengaging the locking lug 244 from the shoulder 242. When the lug and shoulder become disengaged the spring 248 will swing the element 245 clock wise and as the check lever is returned to its normal position the locking lug 244 will rest upon the periphery of the disk 243 thus liberating the rotation shaft 27 and operating keys for operation.

After the feeding handle 147 has been given a full rearward and then forward movement to feed a check, and the shaft 27 freed for rotation, the keys may be depressed to register the next item. During this registration the shaft 27 will be given its usual complete rotation. Near the end of its rotation the locking lug 244 will engage the cam portion 253 and the spring 248 will draw the lug towards the center of the rotation shaft, and near the end of its rotation the shoulder 242 will engage the locking lug 244 and swing the element 245 to the position shown in Fig. 4.

After a check has been issued it is, of course desirable to prevent a second operation of the check feeding mechanism until the keys have again been operated and the machine thereby placed in check printing condition. The cam plate 250 is further provided with a locking slot 254 which engages the stud 144 to lock the check handle against a second operation when a check has been issued and the check handle returned to normal position. When the check handle is moved rearwardly the lug 244 will rest upon the periphery of the disk 243 in the manner just described thereby holding the stud 252 away from the finger 251 and during the reciprocation of the check feeding handle the spring 248 will urge the cam plate 250 downwardly. As the check handle is returned to its normal position the cam plate will snap down at the time the stud 144 is in line with the locking slot 254 thereby locking the check feeding handle. When the keys have again been operated the spring 240 connected to the bell crank will force stud 252 forwardly, carrying with it the tail 251 of plate 250, whereupon the parts will again assume the positions shown in Fig. 4, the stud 144 being disengaged from the slot 254 and the check feeding handle freed for operation.

In addition to its other functions the bell crank lever 247 controls a lock for preventing the shifting of the printing control lever 205 to either its lock or slip positions until after the last check printed upon has been fed out of the machine. The upper arm 256 of the bell crank lever 247 has a shoulder 257 which co-operates with rod 258 journalled between the extensions 199 and 201 (Fig. 8) on the arms 197 and 198. When the machine is in the condition shown in Fig. 4 the control lever 250 cannot be moved forwardly to its lock or slip positions due to the co-operation of the rod 258 with the shoulder 257. When a check has been issued and the shaft 27 freed for rotation in the manner hereinbefore described, so that the element 245 rests upon the periphery of the disk 243, the arm 256 of the bell crang lever will have been rocked downwardly thereby withdrawing the shoulder 257 from the rod 258. The control lever 205 may then be moved to either lock or slip printing position.

During rush hours it may be desirable to be able to use the registering keys without being compelled to operate the check feeding handle 147. It is necessary, therefore, to be able to disengage the locking lug 244 from the shoulder 242 and hold it disengaged when printing is discontinued or when the machine is changed from check printing to sales slip printing condition. The mechanism for doing this comprises a forwardly extending finger 259 on the bellcrank arm 256 provided with a cam edge 260. As has been stated previously, when a check has been issued the shoulder 257 will be withdrawn from locking co-operation with the rod 258. If the parts are in this position and the control lever 205 moved forwardly to its lock position, the rod 258 will be moved forwardly and, thru the cooperation of the rod 258 and cam edge 260 the bell crank 274, will be held rearwardly so as to prevent the engagement of the lug 244 with the shoulder 242 upon subsequent operations of the machine. Movement of the control lever 205 still further to the slip printing position will result in maintaining the rod 258 in engagement with cam surface 260 so that rocking of the bell crank 247 will still be prevented or a slight added rearward movement may be given to the bell crank 247, and thereby simply carry the locking lug 244 still further away from the path of the shoulder 242. It is clear, therefore, that with the control lever 205 set at either its lock or slip position, the keys and the rotation shaft 27 driven thereby are all free for operation without its being necessary to manipulate the check feeding handle 147.

When the control lever is in its lock or slip printing position it is desirable to prevent irregular operations of the machine by locking the check feeding handle 147 against operation. It will be clear, of course, that when the control lever 205 is moved to either its lock or slip position, the bell crank 247 must previously have been moved rearwardly by the last operation of the check handle and held in this position by the means just described and the spring 248 will then have rocked plate 250 downwardly and engaged the stud 144 with the locking slot 254, thus continuously preventing any movement of the feeding handle 147 so long as the control lever is moved to either its lock or slip position.

The sales slips are inserted into a slot 274 far enough to bring between the type carriers and impression hammer the portion of the slip upon which the impression should fall. The Haas application previously mentioned discloses mechanism whereby insertion of a sales slip will be prevented when the printer controlling lever 205 is either at its check or lock position, and since this feature is not involved in the present invention, it will not be described herein.

As already stated when the control lever 205 is moved from the "check" position to the "slip" position the check paper table will be moved forwardly a corresponding amount and by reason of the fact that the tension spring 1212 (Fig. 4) urges the check strip against the plate 209 movement of the check paper table will serve to draw the check paper away from its position between the rollers 214 and 215. As will be seen in Fig. 4, the rollers are cut away or flattened for a portion of their peripheries so that at their normal positions this movement of the paper is permitted. It will be understood that when the control lever 205 is in the "check" position, the check paper will be printed upon on a line a certain distance away from the severing point or tearing edge 313, but when the control lever is moved to the "slip" position the shifting movement of the check strip as explained above, will change the printing line to a point nearer the severed edge of the strip. It should be understood however that the shifting movement of the check paper is not sufficient to bring the check strip out of co-operative relationship with the platen and item type carriers. If the operator should adjust the control lever to the "slip" position and forget to insert a slip in the slot 274, it will be obvious that the printing impression will be effected upon the check strip on a line removed from the normal printing line. If a subsequent operation should now be one requiring printing upon and issuing a check, the control lever would be returned to the "check" position, thereby reversely shifting the check paper so that when the keys of the machine are subsequently operated a second impression will be made upon the check strip within the limits of one check. The last impression, which is the proper one to be considered will be the lower one on the severed check and its position will indicate which of the two impressions is the proper one.

However, in order to prevent confusion by reason of the fact that two amounts will be printed upon the same check the electro roller 215 may be so formed that when the check strip is issued from the machine special type carried by this electro will overprint and delete the improper impression thus permitting only one item to be readable, that being the one corresponding to the amount entered when the control lever was in the "check" position.

The mechanism for accomplishing the above forms no part of the present invention, and is, therefore, not shown or described in detail and for further details reference may be had to the application of Frederick L. Fuller, Ser. No. 594,296, filed October 13, 1922.

In describing the construction of the improved machine it has been necessary incidentally to describe the operation of the various features to such an extent that it is thought that the usual summary of the operation of the machine may be omitted.

While the embodiment herein shown and described is well adapted to fulfill the objects above cited, it is not the intention to limit the invention to the one form of embodiment, as it is capable of various modifications and changes all coming within the scope of the claims which follow:

What is claimed is:

1. In a machine of the class described, the combination with item entering mechanism, of a manually operable check strip feeding device, an operating shaft operable by the item entering mechanism, a locking element secured to the shaft, a locking device movable into engagement with the locking element by the item entering mechanism, a cam plate, and means carried by the check feeding device co-operating with the cam plate adapted to disengage the locking device from the locking element during an operation of the check feeding mechanism.

2. In a machine of the class described, the combination with item entering mechanism, of a check feeding mechanism, devices comprising a manually operated lever for driving said mechanism, a rotatable shaft operable by the item entering mechanism, a locking element secured to said shaft, a locking device movable into engagement with the locking element by operations of the item entering mechanism, a cam plate cooperating with said locking device and formed with a cam slot, and a stud carried by the manually operated lever of the check feeding mechanism, and coacting with said cam slot whereby an operation of the check feeding mechanism will actuate the cam plate to disengage the locking device from the locking element and free the item entering mechanism for operation.

3. In a machine of the class described, the combination with item entering mechanism, of manually operable check feeding mechanism, a rotatable shaft operable by the item entering mechanism, a locking element secured to said shaft, a locking device movable into or out of locking engagement with the locking element, a cam plate co-operating with said locking device and formed with a locking slot, a stud carried by the check feeding mechanism and adapted to coact with said locking slot whereby a reciprocation of the check feeding mechanism will actuate the cam plate to disengage the locking device from locking engagement with the locking element, and means co-operating with the locking device whereby the stud will engage the locking slot to prevent a second reciprocation of the check feeding mechanism without an intervening operation of the item entering mechanism.

4. In a machine of the class described, the combination with item entering mechanism, of a manually operable check feeding mechanism, printing mechanism for printing upon issued checks or inserted slips, devices including a manually adjustable lever for conditioning the printing mechanism for printing upon inserted slips or issued checks, a rotatable shaft operable by the item entering mechanism, a locking element carried by said shaft, a locking device cooperating with the locking element and controlled by the check feeding mechanism, and means carried by the locking device whereby the adjustable lever is locked against movement when the locking element and locking device are placed in locking relation.

5. In a machine of the class described, the combination with item entering mechanism, of manually operable check feeding mechanism, printing mechanism for printing upon inserted slips or issued checks, devices, including a manually adjustable lever for conditioning the printing mechanism for printing upon sales slips or checks, a rotatable shaft operable by the item entering mechanism, a locking element carried by said shaft, a locking device cooperating with said locking element, means carried by the locking device whereby the adjustable lever is locked against movement when the locking element and locking device are placed in locking relation, and means carried by the check feeding mechanism for simultaneously withdrawing the locking device out of locking relation with the locking element and releasing the adjustable lever for movement after an operation of the check feeding mechanism.

6. In a machine of the class described, the combination with item entering mechanism, printing mechanism for printing upon inserted slips or issued checks, a shaft operable by the item entering mechanism, a locking element carried by said shaft, a movable bell crank, a locking device carried by said bell crank and movable thereby into or out of engagement with the locking element, check feeding mechanism comprising a manually operable driving member, a manually adjustable lever adjustable to a plurality of positions for conditioning the machine for printing upon inserted slips or issued checks, means provided on said bell crank whereby the adjustable lever is locked against movement after an operation of the item entering mechanism, and means carried by the manually operable lever of the check feeding mechanism whereby the bell crank is actuated to withdraw the locking device out of locking relation with the locking element and simultaneously to free the adjustable lever for movement after an operation of the check feeding mechanism.

7. In a machine of the class described, the combination with item entering mechanism, a rotatable shaft operable by the item entering mechanism, a locking element carried by said shaft, a bell crank, a locking device carried by said bell crank movable into and out of engagement with the locking element, an adjustable lever adjustable to a plurality of position to control a function of said item entering means, a cam edge formed on the bell crank lever, and a rod movable with said adjustable lever and cooperating with said cam edge whereby movement of the adjustable lever to certain positions will control the bell crank and hold the locking device out of engagement with said locking element.

8. In a machine of the class described, printing mechanism comprising recording elements, strip feeding means and impression controlling means, manipulative means for controlling the position of said recording elements, a lever having an arm adapted to lock said manipulative means against operation and a second arm adapted to prevent movement of said impression controlling means, a rockable member adapted to be engaged and moved by said strip feeding means, and interengaging elements carried by said lever and said member, whereby movement of said strip feeding means will move said lever to unlock said manipulative means and said impression controlling means.

9. A device according to claim 8, in which the rockable member has means for locking the strip feeding means against operation whenever the lever has been moved to unlocking position.

10. A device according to claim 8, in which the lever normally tends to move to locking position on each operation of the manipulative means, and co-operating means formed on said lever and said impression controlling means whereby movement of the last mentioned means will retain said lever in its unlocking position.

11. In a machine of the class described, the combination with item entering mechanism, devices for printing items upon checks, check feeding mechanism, a locking device arranged to lock the item entering mechanism after an operation thereof, a cam plate provided with a locking slot, a stud carried by the check feeding mechanism, a spring constantly urging the said stud and slot in locking cooperation, means normally restraining the spring, and means for disabling the said restraining means to allow the stud and locking slot to be placed in locking cooperation simultaneously with a disabling of the said locking device.

12. In a machine of the class described, the combination with item entering mechanism, a rotatable shaft operable by the item entering mechanism, a locking element carried by the said shaft, a bell crank, a locking device carried by said bell crank movable into or out of engagement with the locking element, check feeding mechanism, a lever adjustable to a plurality of positions, preventing means therefor carried by the said bell crank and means co-operating with the said bell crank under control of the check feeding mechanism for simultaneously moving the said preventing means to free the adjustable lever for movement and withdrawing the locking device out of engagement with the locking element.

13. In a machine of the class described, the combination with item entering mechanism, printer mechanism for printing upon inserted slips or issued checks, check feeding mechanism carrying a stud, a rotatable shaft operable by the item entering mechanism and carrying a locking element, a bell crank, a locking device carried by said bell crank movable into or out of engagement with the locking element, an arm formed with a locking slot cooperating with the said stud carried by the check feeding mechanism, a spring interposed between the arm and bell crank constantly urging the locking slot and stud in locking relation, a lever adjustable to a plurality of positions adapted to condition the printer for check or sales slip printing, means carried by the bell crank for preventing movement of the adjustable lever, additional means carried by said bell crank for preventing movement of the arm to place the stud and slot in locking relation, said stud carried by the check feeding mechanism cooperating with the said arm for actuating the bell crank to move both of said preventing means to ineffective position and simultaneously withdraw the locking device out of engagement with the locking element.

14. In a machine of the class described, the combination with item entering mechanism, printer mechanism for printing upon inserted slips or issued checks, check feeding mechanism, a locking element operable by the item entering mechanism, a bell crank, a locking device carried by the bell crank movable into or out of engagement with the locking element, a lever adjustable to a plurality of positions, preventing means therefor, carried by the bell crank, means carried by the check feeding mechanism for disabling said preventing means to release the adjustable lever for movement and simultaneously withdrawing the locking device out of engagement with the locking element to free the item entering mechanism, and a cam formed on the bell crank co-operating with a member movable with the adjustable lever whereby when the said lever is moved to certain positions the bell crank will be cammed to move the locking device still further from the range of the said locking element.

15. In a machine of the class described, the combination with a keyboard, of mechanism controlled by the keyboard for printing items on a check to be issued from the machine or upon an inserted sales slip, manually adjustable devices for preparing the machine to print upon either checks or slips, a manually driven mechanism for issuing the checks after the items have been printed thereon, and locking devices rendered effective as an incident to printing upon a check for preventing adjustment of the manually adjustable devices until after the check issuing mechanism is operated.

16. In a machine of the class described, the combination with a keyboard, of mechanism actuated by operations of keys in the keyboard for printing upon checks or inserted sales slips, manually adjustable devices for preparing the machine for printing upon either checks or sales slips, a manually operable mechanism for issuing the checks after the items have been printed thereon, and devices rendered effective by operation of a key to print upon a check for preventing adjustment of the manually adjustable devices until the check issuing mechanism has been operated to issue the check last printed upon.

17. In a machine of the class described, the combination with a feeding roller, of a rack having a to and fro movement, a pivotally mounted arm, gearing mounted on said arm for transmitting movements of the rack in one direction to the feeding roller, said rack vibrating the arm without driving the gearing during movement of the rack in the other direction, a pawl for preventing reverse movement of the feeding roller, and means actuated by the pivotally mounted arm when vibrated for locking said pawl.

18. In a machine of the class described, a main rotation shaft, independent check issuing means, a pair of locking elements carried by said shaft and said check issuing means, and a pair of flexibly connected levers cooperating with said locking elements to compel alternate operations of said rotation shaft and said check issuing means.

19. In a machine of the class described, a main rotation shaft, an independently operable check feeding device, locking means carried by said shaft and said device, a pair of flexibly connected levers, one of said levers being provided with a locking slot to cooperate with one of said locking means, and a pivoted member carried by the other of said levers for cooperation with the other locking means, whereby when the shaft and said device are in normal positions one or the other will be locked.

20. In a machine of the class described, a main rotation shaft, an independently operable check issuing device, locking elements carried by said shaft and said device, and a pair of flexibly connected levers, each of said levers being provided with locking means to cooperate with one of said locking elements, the arrangement being such that said shaft and said device are unlocked singly for operation.

In witness whereof I have signed my name this 20th day of March, 1924.

FRED S. HAAS.